US006890657B2

(12) United States Patent
Pickering et al.

(10) Patent No.: US 6,890,657 B2
(45) Date of Patent: May 10, 2005

(54) SURFACE CONTACTING MEMBER FOR TONER FUSING SYSTEM AND PROCESS, COMPOSITION FOR MEMBER SURFACE LAYER, AND PROCESS FOR PREPARING COMPOSITION

(75) Inventors: Jerry A. Pickering, Hilton, NY (US); Stephen V. Davis, Proctorville, OH (US); Theodora Miller, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 277 days.

(21) Appl. No.: 09/879,466

(22) Filed: Jun. 12, 2001

(65) Prior Publication Data

US 2002/0197483 A1 Dec. 26, 2002

(51) Int. Cl.[7] .................................................. B32B 27/00

(52) U.S. Cl. ........................... 428/421; 428/422; 106/2; 106/287.11; 524/262; 524/430; 524/544

(58) Field of Search ................................ 428/421, 422; 524/262, 430, 544; 106/2, 287.11

(56) References Cited

U.S. PATENT DOCUMENTS

| | | | | |
|---|---|---|---|---|
| 3,452,181 A | | 6/1969 | Stryjewski | |
| 3,498,596 A | | 3/1970 | Moser | |
| 3,912,901 A | | 10/1975 | Strella et al. | |
| 3,967,042 A | | 6/1976 | Laskin et al. | |
| 4,011,362 A | | 3/1977 | Stewart | |
| 4,029,827 A | | 6/1977 | Imperial et al. | |
| 4,046,795 A | | 9/1977 | Martin | |
| 4,064,313 A | | 12/1977 | Takiguchi et al. | |
| 4,071,735 A | | 1/1978 | Moser | |
| 4,101,686 A | | 7/1978 | Strella et al. | |
| 4,185,140 A | | 1/1980 | Strella et al. | |
| 4,199,626 A | | 4/1980 | Stryjewski et al. | |
| 4,257,699 A | | 3/1981 | Lentz | |
| 4,264,181 A | | 4/1981 | Lentz et al. | |
| 4,272,179 A | | 6/1981 | Seanor | |
| 4,372,246 A | | 2/1983 | Azar et al. | |
| 4,515,884 A | | 5/1985 | Field et al. | |
| 4,758,618 A | * | 7/1988 | Ito et al. | 524/430 |
| 4,853,737 A | | 8/1989 | Hartley et al. | |
| 4,905,050 A | | 2/1990 | Derimiggio et al. | |
| 4,912,171 A | * | 3/1990 | Grootaert et al. | 525/340 |
| 4,984,027 A | | 1/1991 | Derimiggio et al. | |
| 5,017,432 A | | 5/1991 | Eddy et al. | |
| 5,102,763 A | * | 4/1992 | Winnik et al. | 430/108.24 |
| 5,157,445 A | | 10/1992 | Shoji et al. | |
| 5,217,837 A | | 6/1993 | Henry et al. | |
| 5,247,336 A | | 9/1993 | Mills, III | |
| 5,332,641 A | | 7/1994 | Finn et al. | |
| 5,464,698 A | | 11/1995 | Chen et al. | |
| 5,531,813 A | * | 7/1996 | Henry et al. | 106/2 |
| 5,582,917 A | | 12/1996 | Chen et al. | |
| 5,595,823 A | | 1/1997 | Chen et al. | |
| 5,729,813 A | | 3/1998 | Eddy et al. | |
| 5,780,545 A | | 7/1998 | Chen et al. | |
| 5,824,416 A | * | 10/1998 | Chen et al. | 428/422 |
| 5,851,673 A | | 12/1998 | Chen et al. | |
| 5,853,893 A | | 12/1998 | Chen et al. | |

(Continued)

OTHER PUBLICATIONS

"High Temperature Degradation of Silicone Rubber Compounds in a Silicone Oil Environment", by A.W. Henry, Rubber Chemistry and Technology, American Chemical Society, Rubber Division, Akron, OH, vol. 56, pps. 83–92 (1982).

(Continued)

*Primary Examiner*—David W. Wu
*Assistant Examiner*—Henry S. Hu

(57) ABSTRACT

A surface contacting member for toner fusing systems and processes. This surface contacting member has a fluoroelastomer surface layer containing amorphous silica that has been surface treated with at least one organoaminosilane.

18 Claims, 2 Drawing Sheets

U.S. PATENT DOCUMENTS

| | | | | | |
|---|---|---|---|---|---|
| 5,895,713 | A | * | 4/1999 | Miyazaki et al. | 428/335 |
| 5,935,712 | A | | 8/1999 | Tan et al. | |
| 5,998,033 | A | | 12/1999 | Tan et al. | |
| 6,011,946 | A | | 1/2000 | Eddy et al. | |
| 6,045,961 | A | | 4/2000 | Heeks et al. | |
| 6,090,491 | A | | 7/2000 | Tan et al. | |
| 6,096,429 | A | | 8/2000 | Chen et al. | |
| 6,114,041 | A | | 9/2000 | Tan et al. | |
| 6,159,588 | A | * | 12/2000 | Eddy et al. | 428/215 |
| 6,221,943 | B1 | * | 4/2001 | Hergenrother et al. | 524/265 |
| 6,242,145 | B1 | * | 6/2001 | Galloway et al. | 430/114 |
| 6,261,688 | B1 | * | 7/2001 | Kaplan et al. | 428/391 |
| 6,350,306 | B1 | * | 2/2002 | Tonelli et al. | 106/287.26 |
| 6,485,835 | B1 | * | 11/2002 | Heeks et al. | 428/421 |
| 6,579,929 | B1 | * | 6/2003 | Cole et al. | 524/492 |

OTHER PUBLICATIONS

"Cab–O–Sil Untreated Fumed Silica Properties and Functions" Cabot Corp., Tuscola, IL (1978, 1993).

Silicon Compounds: Register and Review, 5th Edition, R.Anderson et al. (Eds.), United Chemical Technologies, Bristol, PA, pp. 59–75 (1991).

"Cab–O–Sil TS–530 Treated Fumed Silica" Cabot Corp, Tuscola, IL (1991; TSD–131, 10/98).

Davis et al., U.S. application No. 09/450,302, filed Nov. 29, 1999.

Pickering et al., U.S. Application No. 09/879,585, filed Jun. 12, 2001.

Pickering, U.S. application No., 09/879,674, filed Jun. 12, 2001.

* cited by examiner

SURFACE CONTACTING MEMBER FOR TONER FUSING SYSTEM AND PROCESS, COMPOSITION FOR MEMBER SURFACE LAYER, AND PROCESS FOR PREPARING COMPOSITION

CROSS-REFERENCE TO CONCURRENTLY FILED APPLICATIONS

Filed concurrently with this application are the application entitled "Toner Fusing System and Process for Electrostatographic Reproduction", and the application entitled "Toner Fusing System and Process for Electrostatographic Reproduction, Fuser Member for Toner Fusing System and Process, and Composition for Fuser Member Surface Layer". These two concurrently filed applications are incorporated herein in their entireties, by reference thereto.

BACKGROUND OF THE INVENTION

1. Field of the Invention

The present invention relates to electrostatographic imaging and recording apparatus, and particularly to surface contacting members for toner fixing assemblies in these apparatus.

2. Description of Background and Other Information

Generally in electrostatographic reproduction, the original to be copied is rendered in the form of a latent electrostatic image on a photosensitive member. This latent image is made visible by the application of electrically charged toner.

The toner thusly forming the image is transferred to a substrate, such as paper or transparent film, and fixed or fused to the substrate. The fusing of toner to substrate can be effected by applying heat, preferably at a temperature of about 90° C.–200° C.; pressure may be employed in conjunction with the heat.

A system or assembly for providing the requisite heat and pressure customarily includes a fuser member and a support member. The heat energy employed in the fusing process generally is transmitted to toner on the substrate by the fuser member. Specifically, the fuser member is heated; to transfer heat energy to toner situated on a surface of the substrate, the fuser member contacts this toner, and correspondingly also can contact this surface of the substrate itself. The support member contacts an opposing surface of the substrate. Accordingly, the substrate can be situated between the fuser and support members, so that these members can act together on the substrate to provide the requisite pressure in the fusing process.

During the fusing process toner can be offset from the substrate to the fuser member. Toner thusly transferred to the fuser member in turn may be passed on to other members in the electrostatographic apparatus, or to subsequent substrates subjected to fusing.

Toner on the fusing member therefore can interfere with the operation of the electrostatographic apparatus and with the quality of the ultimate product of the electrostatographic process. This offset toner is accordingly regarded as contamination of the fuser member, and preventing or at least minimizing this contamination is a desirable objective.

Release agents, such as those comprising polydimethylsiloxanes, can be applied to fusing members during the fusing process, to combat toner offset. However, these agents may interact with the fusing member surface upon repeated use, and in time cause swelling, softening, and degradation of the fuser member.

Other factors also may disadvantageously affect the fusing member. Heat energy applied to this member can cause its degradation. Degradation can also be effected by continual contact with substrate toner, and by toner remaining on the fusing member surface. The fusing member surface can be subjected to abrasion by a variety of sources—such as the substrate, for instance, as well as elements of the fusing system, like the support member, release agent applicator, and contact heating members, if these are employed.

These unfavorable effects can result in an uneven fusing member surface and defective patterns in thermally fixed images. Where the substrate employed is paper, abrasion of the fusing member surface at the paper edge can form a worn area, or groove, that becomes problematic when the paper size is changed so that a larger paper overlaps the worn area. When the groove becomes deep enough to affect the fixing of the toner it causes objectionable image defects.

Where high image quality, and/or high image gloss, and/or controlling fusing member surface roughness are required, surface wear and abrasion are particular problems. For instance, if obtaining very high image quality is the objective, even a groove only worn into the surface enough to show a variation in surface gloss will nevertheless generate an objectionable defect in the image.

Inorganic fillers have been incorporated into fluoroelastomer surface layers to achieve the desired combination of properties like wear resistance, modulus, and thermal conductivity. However, it is difficult to provide surface layers which are suitably free of defects, and which—in combination with high wear resistance—have a sufficiently high gloss, or are otherwise of the requisite degree of smoothness. Particularly it is difficult to provide surface layers with these desirable properties where the layers are obtained by application of the fluoroelastomer composition in solution, especially where the layers are built up to the desired thickness by applying successive coats.

U.S. Pat. No. 4,064,313 discloses a fuser member with an intermediate polysiloxane layer, for adhering a silicone rubber outer layer to the fuser core. This patent further teaches including finely powdered silica in the polysiloxane material, to improve mechanical strength. U.S. Pat. No. 4,199,626 discloses including silica as a filler in the fluoropolymer surface layer of a fuser member.

However, silica incorporated in fluoroelastomer compositions renders the compositions more difficult to dissolve. This difficulty interferes with using these compositions to make the coating preparations from which fuser member layers are formed.

The incorporated silica also causes crepe hardening in the fluoroelastomer compositions, leading them to exhibit very poor coating qualities. Specifically, the crepe hardening results in gel defects in the coating preparations, and ultimately in fuser member layers formed from these preparations. These defects bring roughness to the fuser member surfaces, and diminish gloss.

SUMMARY OF THE INVENTION

It has been discovered that where amorphous silica for incorporation with fluoroelastomer has been treated, particularly surface treated, with organoaminosilane, this organoaminosilane treatment makes dissolving the silica-incorporating fluoroelastomer easier.

As to the foregoing, the invention pertains to a composition comprising fluoroelastomer, amorphous silica that has been treated, particularly surface treated, with organoaminosilane, and curative; it further may comprise a solvent. This composition can be employed to prepare coatings and surface layers, for surface contacting members used in toner fusing systems and processes.

The invention further pertains to a surface contacting member for toner fusing systems and processes. The surface contacting member of the invention has a surface layer that comprises fluoroelastomer and amorphous silica that has been treated, particularly surface treated, with organoaminosilane. The surface layer of the invention exhibits a high degree of smoothness, as well as glossiness where desired; this layer further is characterized by superior wear resistance.

The invention yet additionally pertains to a process of preparing a coating composition for a surface contacting member. By preparing the coating composition in accordance with the process of the invention, any gels which have formed are eliminated, or at least substantially or essentially eliminated, and the deleterious effects of whatever crepe hardening has occurred are correspondingly negated.

BRIEF DESCRIPTION OF THE DRAWINGS

FIGS. 2 and 3 also can be taken as representing other surface contacting members of the invention, such as support and gloss control members.

DESCRIPTION OF THE INVENTION

Figure 1:
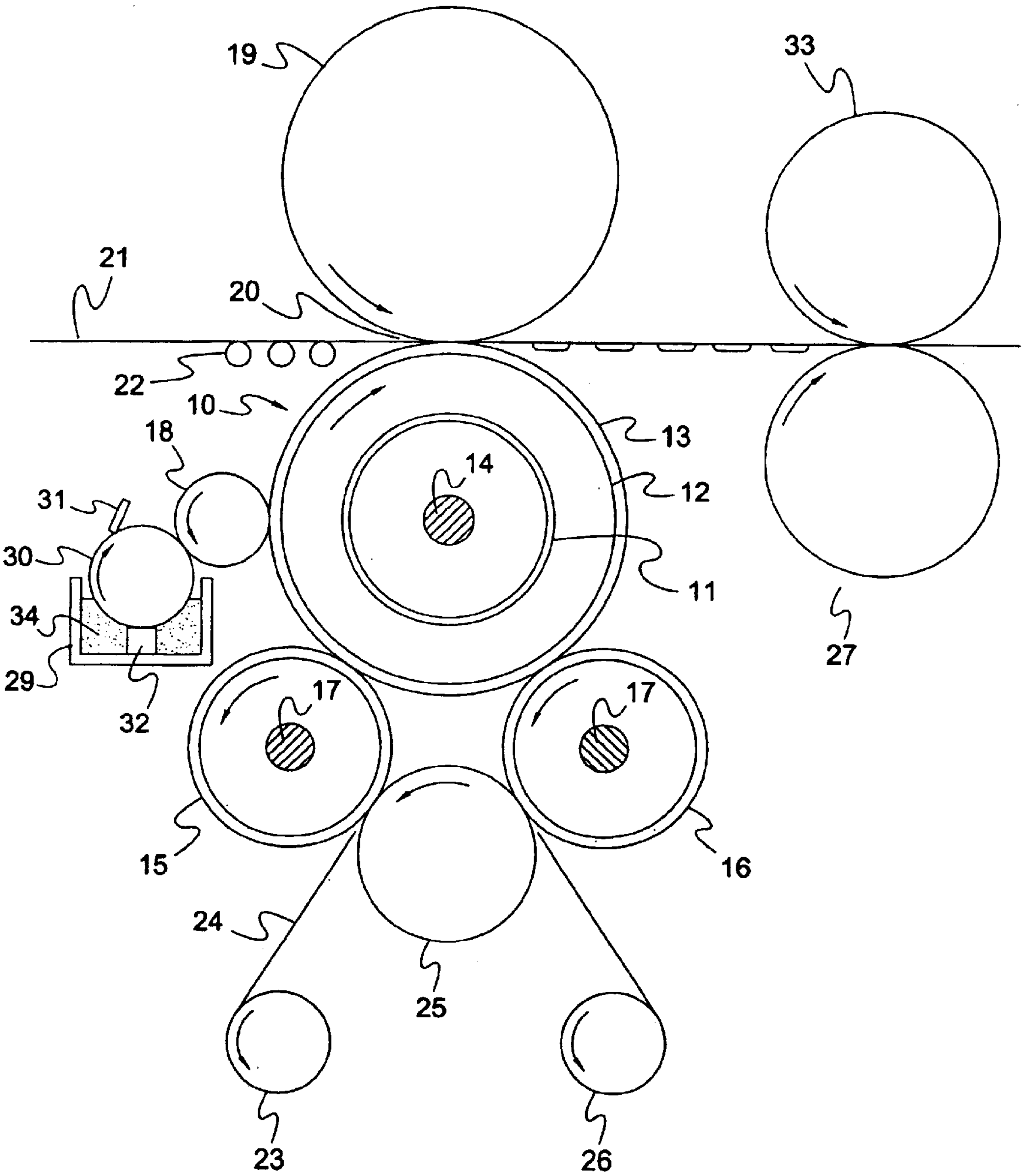
FIG. 1 is a schematic representation, and a sectional view, of a toner fusing assembly of the invention.

Copolymers are understood as including polymers incorporating two monomeric units, as well as polymers incorporating three or more different monomeric units, e.g., terpolymers, tetrapolymers, etc.

Polyorganosiloxanes are understood as including polydiorganosiloxanes—i.e., having two organo groups attached to each, or substantially each, or essentially each, of the polymer siloxy repeat units. Polyorganosiloxanes are further understood as including polydimethylsiloxanes.

Organoaminosilanes are understood as including compounds having at least one organo group, at least one amino group, and at least one silyl group.

The term "organo" as used herein, such as in the context of polyorganosiloxanes and oganoaminosilanes, includes "hydro-carbyl", which includes "aliphatic", "cycloaliphatic", and "aromatic". The hydrocarbyl groups are understood as including the alkyl, alkenyl, alkynl, cycloalkyl, aryl, aralkyl, and alkaryl groups. Further, "hydrocarbyl" is understood as including both nonsubstituted hydrocarbyl groups, and substituted hydrocarbyl groups, with the latter referring to the hydrocarbyl portion bearing additional substituents, besides the carbon and hydrogen. Preferred organo groups for the polyorganosiloxanes and organoaminosilanes are the alkyl, aryl, and aralkyl groups. Particularly preferred alkyl, aryl, and aralkyl groups are the $C_1$–$C_{18}$ alkyl, aryl, and aralkyl groups, particularly the methyl and phenyl groups.

Surface contacting members are understood to be elements in the toner fusing system for contacting one or both of the substrate surface and the fuser member surface. The fuser member and support member are surface contacting members. The release agent applicator, when present, and when in a form—such as that of a donor roller oiler—that can have a surface layer for contacting the fuser member surface, can also be a surface contacting member. Yet additionally, the toner fusing system can include a gloss control member; when present, it likewise is a surface contacting member. And if there is a gloss control member, it can be accompanied by its own support member, which also is a surface contacting member.

The gloss control member is an article provided for the particular purpose of controlling the quality of, and imparting a desired finish to, the image produced on the substrate by the affixed toner. This member is positioned in the tuner fusing system or process to contact the affixed toner, or both the affixed toner and the substrate on which this toner resides, after the toner fusing step. Where there is a support member for the gloss control member, the gloss control member acts together with its support member in the same manner that the fuser member cooperates with its support member.

At least one of the surface contacting members, of the toner fusing system and process of the present invention, includes a surface layer comprising at least one polyfluorocarbon elastomer, or fluoroelastomer, and amorphous silica particles that have been treated, particularly surface treated, with organoaminosilane, particularly organoaminosilane that is reactive with amorphous silica. Particularly, this surface layer comprises the polyfluorocarbon elastomer or fluoroelastomer with the organoaminosilane-treated amorphous silica particles dispersed therein as filler.

It is understood that a thusly identified fluoroelastomer layer, incorporating organoaminosilane-treated amorphous silica as indicated, is a surface layer of the invention; it may also be referred to as a fluoroelastomer layer of the invention. It is further understood that a surface contacting member, provided with a surface layer of the invention, is correspondingly a surface contacting member of the invention.

Accordingly, a surface contacting member of the invention can include a base, and a surface layer of the invention, as indicated, overlaying this base. Where the fuser member in particular is a surface contacting member of the invention, it comprises a fuser base and a surface layer of the invention, with this surface layer overlaying the fuser base and serving as a fusing surface layer.

The base of a surface contacting member of the invention may comprise a core, plate, or belt, as disclosed in the application. In the case of a belt, preferably it is mounted on rollers, also as disclosed in the application identified.

The surface layer of the invention can reside directly on the member base. Alternatively, there can be one or more materials and/or layers—for example one or more cushions or cushion layers—interposed between this fluoroelastomer layer and the base or member.

The indicated one or more cushions or cushion layers likewise may comprise a cushion as disclosed in the application identified. A preferred cushion comprises one or more silicone elastomer layers, with two particularly preferred silicone elastomers for this purpose being Silastic™-J silicone, from Dow Corning Corporation, Midland, Mich., and a silicone commercially available under the designation EC4952 from Emerson & Cuming ICI, Billerica, Mass.

As known in the art, a donor roller oiler is a release agent applicator which includes a metering roller that takes up release agent from its supply source, a metering blade, which can be a rubber, plastic, or metal blade, that skims excess release agent from the metering roller, and a delivery roller that receives release agent from the metering roller, and contacts the fuser member surface to apply release agent thereon. Where a donor roller oiler is present, and indeed is a surface contacting member of the invention, then it is the delivery roller thereof that comprises a base and surface layer of the invention.

For a surface layer of the invention, suitable fluoroelastomers include random polymers comprising two or more monomeric units, with these monomeric units comprising members selected from a group consisting of vinylidene fluoride [$-(CH_2CF_2)-$], hexafluoropropylene [$-(CF_2CF(CF_3))-$], tetrafluoroethylene [$-(CF_2CF_2)-$], perfluorovinylmethyl ether [$-(CF_2CF(OCF_3))-$], and ethylene [$-(CH_2CH_2)-$]. Among the fluoroelastomers that may be used are fluoroelastomer copolymers comprising vinylidene fluoride and hexafluoropropylene, and terpolymers as well as tetra- and higher polymers including vinylidene fluoride, hexafluoropropylene, and tetrafluoroethylene monomeric units. Another suitable monomer is perfluorovinylmethyl ether.

Preferred fluoroelastomers include random polymers comprising the following monomeric units:

$$-(CH_2CF_2)_x-,\ -(CF_2CF(CF_3))_y-,\ \text{and}\ -(CF_2CF_2)_z-,$$

wherein x is from about 30 to about 90 mole percent, y is from about 10 to about 60 mole percent, and z is from about 0 to about 42 mole percent.

Further preferred fluoroelastomers are random polymers comprising the following monomeric units:

$$-(CH_2CH_2)_x-,\ -(CF_2CF(OCF_3))_y-,\ \text{and}\ -(CF_2CF_2)_z-,$$

wherein x is from about 0 to about 70 mole percent, y is from about 10 to about 60 mole percent, and z is from about 30 to about 90 mole percent.

The fluoroelastomers, as discussed, may further include one or more cure site monomers. Among the suitable cure site monomers are 4-bromoperfluorobutene-1,1,1-dihydro-4-bromo-perfluorobutene-1,3-bromoperfluorobutene-1, and 1,1-dihydro-3-bromoperfluoropropene-1. When present, cure site monomers are generally in very small molar proportions. Preferably, the amount of cure site monomer will not exceed about 5 mole percent of the polymer.

The fluoroelastomer molecular weight is largely a matter of convenience, and is not critical to the invention. However, as a matter of preference, the fluoroelastomers have a number average molecular weight of from about 10,000 to about 200,000. More preferably they have a number average molecular weight of from about 50,000 to about 100,000.

Commercially available fluoroelastomers which may be used are those sold under the trademark Viton® by Dupont Dow Elastomers, Stow, Ohio; they include Viton® A, Viton® B, Viton® E, Viton® GF, Viton® GH, Viton® GFLT, Viton® B 50, Viton® B 910, Viton® E 45, Viton® E 60C, and Viton® E 430. Also suitable are the Tecnoflons®, such as T838K and FOR4391 from Ausimont USA, Inc., Thorofare, N.J., and the Fluorel™ fluoroelastomers, such as FE5840Q, FLS5840Q, FX9038, and FX2530 from Dyneon L.L.C., Oakdale, Minn.

Appropriate fluoroelastomers include those as identified in U.S. Pat. Nos. 4,372,246, 5,017,432, 5,217,837, and 5,332,641. These four patents are incorporated herein in their entireties, by reference thereto.

The Viton® A, Viton® GF, FE5840Q, and FX9038 fluoroelastomers are particularly preferred.

Fluoroelastomer preferably comprises from about 30 percent by volume to about 90 percent by volume of fluoroelastomer compositions used to prepare coating preparations of the invention. Fluoroelastomer likewise preferably comprises from about 30 percent by volume to about 90 percent by volume of surface layers of the invention.

As indicated, the silica of the surface layer of the invention is amorphous silica. One type of amorphous silica which may be used is fumed silica; another type is precipitated silica.

The amorphous silica has a low density, and correspondingly a high surface area. Typically it is employed in the form of aggregates. Preferably the amorphous silica aggregates of the invention have a mean particle diameter of from about 0.05 microns to about 1 micron, more preferably from about 0.2 microns to about 0.5 microns, and preferably the particles comprising these aggregates have a mean particle diameter of from about 0.001 microns to about 0.1 micron.

Amorphous silica, and the particular fumed and precipitated forms, are known in the art. They can be obtained according to methods as likewise are known.

Fumed silicas can be made from the thermal combustion of small organosilicons. One means of producing fumed silica is by hydrolysis of chlorosilanes, such as in accordance with the procedures set forth in the technical bulletin "Cab-O-Sil® Untreated Fumed Silica Properties and Functions" (1978, 1993), from Cabot Corporation, Tuscola, Ill.; this bulletin is incorporated herein in its entirety, by reference thereto. As discussed therein, chlorosilanes are subjected to high temperature hydrolysis in a hydrogen/oxygen flame, with silica droplets (7–27 nm) resulting from this treatment. As the droplets cool, they form aggregates 0.2 to 0.5 microns in size.

Precipitated silicas can be prepared by reacting organosilicon molecules in solution, to obtain particles in the form of a predominantly silica network. The particles will be amorphous, and can be collected when they come out of solution. They often will have a small amount of organic component, but this feature can be controlled by the starting materials that are employed. A particular method of forming precipitated silicas is by the solution condensation of chlorosilanes and organochlorosilanes.

The amorphous silica of the invention further is amorphous silica that has been treated, particularly surface treated, with at least one organoaminosilane, particularly at least one amorphous silica-reactive organoaminosilane—i.e., organoaminosilane which is reactive with the amorphous silica, particularly the surface thereof, and most especially the surface hydroxyl groups thereof. Suitable organoaminosilanes for the amorphous silica treatment include silazanes, amine functional organosilanols, and amine functional organohalosilanes.

Silazanes that may be used include disilazanes and cyclosilazanes. Particular disilazanes that are suitable include hexamethyldisilazane, 1,3-diphenyltetramethyldisilazane, 1,3-divinyl tetramethyldisilazane, and heptamethyldisilazane. A particular cyclosilizane that may be used is 2,2,4,4,6,6-hexamethylcyclotrisilazane. As to the foregoing, it is understood that the silazanes of the invention include at least one organo group and at least one amino group.

Amine functional organosilanols that may be used include primary, secondary, and tertiary amine functional organosilanols, particularly the mono-, di-, and tri-methoxy and ethoxy silanols. Suitable amine functional organosilanols include those having the formula $R_1SiR_2R_3R_4$ wherein $R_1$ is selected from the group consisting of primary, secondary and tertiary amino group-containing $C_1$–$C_{10}$ hydrocarbyl groups;

from one to all three of $R_2$, $R_3$, and $R_4$ have the formula —$OR_5$, with the remainder being the same or different, and being selected from the group consisting of $C_1$–$C_8$ hydrocarbyl groups and hydrogen; and each $R_5$ is the same or different $C_1$–$C_8$ hydrocarbyl group.

Of the foregoing, preferred amino functional organosilanols include those wherein each $R_5$ is the same or different, and is selected from the group consisting of methyl and ethyl groups. Most preferably in this instance, each $R_5$, thusly being selected from the group consisting of methyl and ethyl groups, is the same.

Particular amine functional organosilanols that may be used include aminophenyltrimethoxysilane, 3-aminopropyltrimethoxysilane, 3-aminopropyltriethoxysilane, 4-aminobutyltrimethoxysilane, 4-aminobutyltriethoxysilane, 3-aminopropyldimethylethoxysilane, bis(trimethoxysilylpropyl)amine, N-phenyl-aminopropyltrimethoxysilane, and N-(2-aminoethyl)-3-amino-propylmethyldimethoxysilane.

Amine functional organohalosilanes that are suitable include tertiary amine functional organohalosilanes, such as those having the formula $R_6SiR_7R_8R_9$ wherein $R_6$ is selected from the group consisting of tertiary amino group-containing $C_1$–$C_{10}$ hydrocarbyl groups; and from one to all three of $R_7$, $R_8$, and $R_9$ are the same or different halogen, with the remainder also being the same or different, and being selected from the group consisting of $C_1$–$C_8$ hydrocarbyl groups and hydrogen.

Halogens suitable for the amine functional organohalosilanes include chlorine, bromine, and iodine. Fluorine generally is not suitable, because the Si—F bond is too stable to readily cleave for the requisite endcapping reaction. Most preferably, each of the halogens is chlorine.

Particular amine functional organohalosilanes which may be used include 2-[2-(trichlorosilyl)ethyl]pyridine and N-trichlorosilylpropyl-N,N,N,trimethylammonium chloride.

The organoaminosilane which is most preferred for treatment of the amorphous silica is hexamethyldsilazane.

The amorphous silica may be treated with the requisite one or more organoaminosilanes according to any of the methods known in the art, and organoaminosilane-treated amorphous silicas, particularly organoaminosilane surface-treated amorphous silicas, are commercially available. Particularly, among the means by which surface treatment may be accomplished are known means of deposition from aqueous alcohol solutions or aqueous solutions, bulk deposition directly onto the powder, or exposure to vapor, means therefor also being known. The preferred method is treatment by exposure to vapors.

It appears that the organoaminosilane surface treatment of the amorphous silica is the basis for multiple interactions. For instance, as to the treatment itself, there is reaction of organoaminosilane and silica. Moreover, regarding the organoaminosilane-treated silica and the fluoroelastomer with which the treated silica is employed, there also seems to be interaction between polymer and organoaminosilane amino moiety.

Regarding organoaminosilane and amorphous silica, there is reaction of organoaminosilane with surface hydroxyl groups of the amorphous silica, releasing hydrogen and capping the remaining SiO— radical. With the amine functional organohalosilanes, this endcapping reaction releases the corresponding halogen acid. Typically, the amine functional organosilanols have an alcoholic leaving group. Use of the silazanes results in evolution of ammonia, with residual nitrogen possibly remaining as an active group.

Fumed silica is commercially available under the trademark Cab-O-Sil® from Cabot Corporation. One type of the fumed silica is Cab-O-Sil® LM-130. A hexamethyldisilazane surface treated fumed silica is sold under the designation Cab-O-Sil® TS-530, and this thusly treated silica is discussed in the technical bulletin “CAB-O-SIL® TS-530 Treated Fumed Silica” (1991; TSD-131, 10/98), from Cabot Corporation; this bulletin is incorporated herein in its entirety, by reference thereto.

Fumed silica also is commercially available under the trademark Wacker HDK® from Wacker Silicones Corporation, Adrian, Mich. An organoamimosilane surface treated fumed silica is sold under the designation Wacker HDK® H2050.

Precipitated silica is commercially available from Degussa-Huls Corporation, Parsippany, N.J.

As to fluoroelastomer compositions incorporating the indicated organoaminosilane-treated amorphous silica, the coatings and surface layers formed from these compositions are uniform, smooth, and exhibit a low surface roughness that can be manifested, in terms of appearance, as glossiness. Additionally, with respect to employing the indicated fluoroelastomer compositions to prepare coating compositions—e.g., coating solutions or dispersions—as discussed herein, the organoaminosilane treatment minimizes the difficulty of dissolving the incorporated silica. And yet further, the amino moiety interaction in particular, having been mentioned, appears to render the coatings self-leveling, as well as to contribute to glossiness.

The nature of the referred-to interactions is not fully understood. Other than the particular reactions as are noted, it is not known to what extent further chemical reactions and other mechanisms are involved. The interactions are addressed herein for the purpose of discussing the invention as fully as possible according to the best current understanding thereof, and this attempt is not to be considered as limiting the scope of the invention.

The organoaminosilane-treated amorphous silica preferably is present—in fluoroelastomer compositions used to prepare the coating preparations of the invention—in an amount of from about 2 percent by volume to about 35 percent by volume of the compositions. It is believed that this is the proportional range at which the requisite leveling effect and glossiness will be achieved. The treated amorphous silica more preferably comprises from about 5 percent by volume to about 30 percent by volume, and still more preferably comprises from about 5 percent by volume to about 20 percent by volume, of the fluoroelastomer compositions as indicated. Correspondingly, the organoaminosilane-treated amorphous silica comprises preferably from about 2 percent to about 35 percent, more preferably from about 5 percent to about 30 percent, and still more preferably from about 5 percent to about 20 percent, by volume of surface layers of the invention.

The high surface area of this amorphous silica gives it an exemplary reinforcing capability, which supplies toughness and wear resistance to layers prepared with fluoroelastomer compositions comprising the indicated treated silica. Moreover, high silica levels are desirable for obtaining great toughness and wear resistance.

However, the high surface area that provides the indicated advantages also contributes to the occurrence of crepe hardening in the fluoroelastomer compositions as referred to—e.g., the dry compounded compositions, as are herein discussed. Particularly, at proportions of about 5 percent by volume or higher, the crepe hardening can interfere with the use of these compositions, and especially can interfere with employing these compositions to make coating solutions or dispersions. The crepe hardening in fact can cause defects, and especially gel defects, in the coatings, and likewise in surface layers of the invention.

In this regard, crepe hardening involves slow physical crosslinking between the organoaminosilane-treated silica and the fluoroelastomer, and results in the formation of physical gels in the composition; these gels arise from the interaction of the filler surface with the fluoroelastomer. Gels produced by crepe hardening are not entirely understood, and are also attributed to chemical interaction between the filler surface and the fluoroelastomer polymeric matrix.

The degree of crepe hardening that occurs is a function both of the proportion of organoaminosilane-treated amorphous silica in the indicated fluoroelastomer composition, and of the amount of time the composition stands, or otherwise is extant. Accordingly, the higher the silica content, the more quickly gelling occurs, and the more extensive crepe hardening is during a particular amount of standing time—the shorter the shelf life; correspondingly, the greater the indicated standing time, the more extensive the crepe hardening. In any event, also as discussed herein, the problem of crepe hardening can be addressed by formulation of the coating composition in accordance with the preparation process of the invention.

In addition to the organoaminosilane-treated amorphous silica, one or more other types of fillers may be used with the fluoroelastomer for various purposes, such as to achieve higher thermal conductivity or enhance interaction with release agent. Particular fillers which are suitable include SnO2, SiC, CuO, ZnO, $Al_2O_3$, FeO, and $Fe_2O_3$. A particular type of $Fe_2O_3$ that may be used is $Fe_2O_3$ prepared from at least one sulfur-containing iron compound, as disclosed in the application identified.

Yet other additives and adjuvants also may be used with the fluoroelastomer, as long as they do not affect the integrity thereof, or significantly interfere with an activity intended to occur in the layer, such as the crosslinking of the fluoroelastomer. Suitable examples include reinforcing fillers, crosslinking agents, processing aids, accelerators, polymerization initiators, and coloring agents.

These further fillers, additives, and adjuvants, where present, are provided in amounts and proportions as are generally known or as can be determined without undue experimentation by those of ordinary skill in the art. Particularly the one or more other fillers, if employed, are present preferably in a total amount of up to about 25 percent by volume of the fluoroelastomer compositions, and correspondingly of the surface layers.

The one or more other fillers may be in one or more of any suitable shapes—irregular, as well as in the form of spheroids, platelets, flakes, powders, ovoids, needles, fibers, and the like. For filler which is employed for the purpose of providing thermal conductivity, and particularly in such instance and where internal heating is employed, an irregular shape is more preferred, as are spherical particles and platelets, so as to maximize the heat conducting effect of the filler particles; fibers, needles, and otherwise elongated shapes are less preferred here, unless they are advantageously oriented, because in certain alignments they are less effective for properly conducting heat.

In this regard, elongated particles are more efficient for conducting heat in the proper direction if they are at right angles to the fuser base—radially aligned, if the fuser base is a cylindrical core, belt on rollers, or a core-mounted plate, but less efficient if they are positioned parallel to the core—axially aligned, if the fuser base is a core, a belt, or is core mounted as indicated. Accordingly, to maximize heat conducting properties where elongated heat conducting particles are employed, perpendicular (radial) positioning is preferred, while parallel (axial) alignment may be employed but is not preferred.

These further one or more fillers preferably have a mean particle diameter of about 0.1 microns to about 80 microns, more preferably about 0.2 microns to about 12 microns.

For improving wear resistance, any of the one or more other fillers which is employed may be utilized or surface treated with a coupling agent, preferably a silane coupling agent, as discussed in the application identified in U.S. Pat. Nos. 5,998,033, 5,935,712, and 6,114,041. These patents are incorporated herein in their entireties, by reference thereto.

For preparation of the fluoroelastomer layer of the invention, one or more curing agents or curatives are employed in a suitable amount to effect curing of the fluoroelastomer. Suitable curatives for the fluoroelastomer include nucleophilic addition curing systems. Also appropriate as curatives are free radical initiator curing systems.

Preferred nucleophilic addition curing systems for the fluoroelastomer are the bisphenol curing systems. These preferably include at least one bisphenol crosslinking agent and at least one accelerator.

Suitable bisphenol crosslinking agents include 4,4-(hexafluoroisopropylidene)diphenol, also known as bisphenol AF, and 4,4-isopropylidenediphenol. Accelerators which may be employed include organophosphonium salt accelerators such as benzyl triphenylphosphonium chloride.

The amount of bisphenol crosslinking agent used, and likewise the amount of accelerator used, each is preferably from about 0.5 parts to about 10 parts per 100 parts by weight of the fluoroelastomer. A bisphenol curing system, taken as a whole, is employed in an amount, based on the total weight of crosslinking agent and accelerator, likewise of from about 0.5 parts to about 10 parts per 100 parts by weight of the fluoroelastomer. A commercially available bisphenol curing system which may be used is Viton® Curative No. 50 from Dupont Dow Elastomers, which is a combination of bisphenol AF and one or more quaternary phosphonium salt accelerators; this curative preferably is used in an amount of from about 2 parts to about 8 parts per 100 parts by weight of the fluoroelastomer.

Further nucleophilic addition curing systems are polyfunctional hindered curing systems, particularly diamine curing systems. Among the diamine curing systems that may be employed are diamine carbamate curing systems. Examples of these are hexamethylenediamine carbamate and N,N'-dicinnamylidene-1,6-hexanediamine; these are commercially available as DIAK No. 1 and DIAK No. 3, respectively, from E. I. Du Pont de Nemours, Inc. DIAK No. 4 is another polyfunctional hindered diamine curing system that may be used.

Free radical initiator curing systems which may be used include peroxide free radical initiator curing systems. Preferably these comprise at least one peroxide free radical initiator, and at least one suitable crosslinking agent; peroxides that may be employed for this purpose include the suitable aliphatic peroxides.

Particular peroxides which may be used include ditertiary butyl peroxide, dicumyl peroxide, 2,4-dichloro-benzoyl peroxide, 2,5-dimethyl-2,5-di(t-butyl peroxy)hexane, dibenzoyl peroxide and the like. Particular crosslinking agents suitable for these systems include triallyl cyanurate, triallyl isocyanurate, and others known in the art.

Where the curative comprises a nucleophilic addition curing system or a free radical initiator curing system, one or more cocuratives may also be employed. In this regard, the use of these systems for curing fluoroelastomers can generate hydrogen fluoride. Accordingly, acid acceptors for neutralizing the hydrogen floride are suitable cocuratives. Examples of these acid acceptors are the Lewis bases, particularly inorganic bases such as magnesium oxide, zinc oxide, lead oxide, calcium oxide and calcium hydroxide.

Stronger bases, such as the indicated calcium hydroxide, indeed may be employed as cocuratives, but are not preferred. In fact their use should be minimized and even avoided, particularly where sufficient duration of shelf life (for instance at least about two hours, and possibly much longer), before crosslinking progresses to an unusable viscosity (such as about 500 centistokes or more), is an issue for the fluoroelastomer solution or dispersion of the invention. Preferred cocuratives accordingly are the weaker bases, such as magnesium oxide and zinc oxide.

The amount of cocurative which is used preferably is from about 1 parts to about 20 parts per 100 parts by weight of the fluoroelastomer. Particularly where one or more acid acceptors is employed, the amount used is preferably that which is sufficient to neutralize the indicated hydrogen fluoride and allow for complete crosslinking. However, an excessive amount of cocurative, even in the case of the weaker bases, will shorten the life of the fluoroelastomer coating composition. Specifically, cocurative excess will cause rapid viscosity increase and solution gellation.

A fluoroelastomer composition, such as is used for preparing the fluoroelastomer solution or dispersion of the invention, can comprise the fluoroelastomer and organoaminosilane-treated amorphous silica. It can also include one or more of those of the foregoing curative, cocurative, additional filler, adjuvant, and additive components that are being employed.

As an embodiment of the invention, this composition in particular can comprise the fluoroelastomer, treated silica, and curative. This embodiment further can include one or more of the other components as indicated.

The indicated fluoroelastomer composition may be formed by any means suitable for combining the components. An appropriate dry compounding method is preferred.

Dry compounding may be conducted with a two roll mill. It may be carried out at a temperature of from about 40° F. to about 200° F., or from about 50° F. to about 100° F. However, preferably the compounding is carried out at approximately room temperature, for example, from about 50° F. to about 70° F. (from about 10° C. to about 21° C.), more preferably from about 55° F. to about 65° F. (from about 13° C. to about 28° C.). This operation tends to generate heat, so preferably a mill with its operating temperature inhibited by some means, such as by water cooling, is employed. The materials are compounded until a uniform, dry, flexible composite sheet is obtained.

Commercially provided fluoroelastomers often come with curatives already incorporated therein. However, it is preferred that the curative not be provided in this manner, but rather be employed as a separate component.

Curative, as such a separate component, may be combined—e.g., dry compounded—with the other indicated components.

However preferably it is not, but rather is subsequently added to the solution or dispersion that is prepared from the fluoroelastomer composition—e.g., the dry compounded materials—as indicated. Withholding the curative thusly for addition to the indicated coating composition greatly extends this composition's shelf life. And most preferably, the curative is added to the solution or dispersion particularly in accordance with the coating composition preparation process of the invention.

For preparing the requisite fluoroelastomer layer of the invention, the fluoroelastomer composition can be combined with suitable solvent. Specifically in the case of the fluoroelastomer composition obtained from dry compounding, this composition is divided into pieces and added to a sufficient amount of one or more solvents to provide a solution, or a dispersion. Further components may also be included therein.

For instance, one or more of the polydiorganosiloxane oligomers, particularly the $\alpha,\omega$ difunctional polydiorganosiloxanes, disclosed in U.S. Pat. No. 4,853,737 may be employed in the amount of about 0.1 to 5 grams per 100 grams of solution, or in an amount of up to about 80 parts per hundred parts by weight of the fluoroelastomer; this patent is incorporated herein in its entirety, by reference thereto. Particularly, the fluoroelastomer with pendant polydiorganosiloxane segments disclosed in this patent is suitable as the fluoroelastomer component of the present invention.

Further, one or more of the curable siloxane polymers, particularly the curable polyfunctional poly($C_{1-6}$ alkyl)-siloxane polymers, disclosed in U.S. Pat. No. 5,582,917, may be employed in the amount of up to about 80 parts, or from about 5 parts to about 80 parts, per hundred parts by weight of the fluoroelastomer; this patent is incorporated herein in its entirety, by reference thereto. A preferred commercially available curable siloxane polymer is SFR-100 silicone, from GE Silicones, Waterford, N.Y. Particularly, the fluorocarbon copolymer-siloxane polymer composite disclosed in this patent is suitable as the fluoroelastomer component of the present invention.

If both polydiorganosiloxane oligomer and curable siloxane polymer, as discussed, are employed, it is preferable that they be kept separate prior to addition to the fluoroelastomer, because these polydiorganosiloxane oligomers catalyze the crosslinking of the curable siloxane polymers.

Still further, one or more yet additional additives and/or adjuvants can be added to the solution, such as defoaming agents, wetting agents, and other materials. These yet additional adjuvants and fillers, where present, are provided in amounts and proportions as are generally known or as can be determined without undue experimentation by those of ordinary skill in the art.

The amount of solvent used is preferably that which will provide a solution or dispersion having a solids content of from about 10 weight percent to about 50 weight percent, more preferably from about 20 weight percent to about 30 weight percent. Suitable solvents include polar solvents, such as ketones, esters and acetates. Particular solvents which may be used are acetone, ethyl acetate, and butyl acetate. The ketones are preferred, especially methyl ethyl ketone (MEK), methyl isobutyl ketone, and mixtures thereof; a preferred solvent comprises 50 weight percent each of methyl ethyl ketone and methyl isobutyl ketone. Other preferred solvents are blends of methyl ethyl ketone and methanol (MeOH), such as blends comprising about 85 percent by weight methyl ethyl ketone and about 15 percent by weight methanol (85:15 MEK:MeOH). Methanol is used to extend the solution life of the coating, or to improve the coating quality.

As discussed herein, the fluoroelastomer composition, comprising organoaminosilane-treated amorphous silica, can experience crepe hardening, resulting in physical gels. As discussed herein, the degree of crepe hardening is a function of silica content and standing time. There is accordingly a window of opportunity for use of the composition where gel formation will not present a problem.

For instance, if the fluoroelastomer composition, such as that provided by dry compounding, is combined with the solvent immediately after its formulation (for example, formulation by the dry compounding procedure), then there will not be time for the crepe hardening to have taken significant effect. And the lower the silica content of the fluoroelastomer composition, the greater the amount of standing time can be permitted, without gel formation becoming a problem.

If crepe hardening indeed has sufficiently progressed, however, then when the fluoroelastomer composition is added to solvent, the physical gels that have formed can render the composition at least partially insoluble. Moreover, the gels will form defects in resultant coatings, and correspondingly in surface layers formed by these coatings. These defects accordingly interfere with the smoothness of the coatings and surface layers; gloss also will be reduced, where it is a function of smoothness.

Mixing the fluoroelastomer composition in solvent under shear, particularly high shear, contributes to breaking up gels that are present. By itself, however, this mixing under shear is insufficient to eliminate gels completely if the progression of crepe hardening has been too extensive. Mixing under high shear alone likewise may not be enough if too high a degree of roughness control, and/or too great a gloss, is required for the resulting coating and/or surface layer.

However, it has been discovered that, at least where the type of curative used is a bisphenol curing system, gel defects can be eliminated by proper employment of this curative during the process of preparing the coating composition. In this regard, contrary to expectations, the presence of bisphenol crosslinker and requisite accelerator, with the fluoroelastomer composition components in solvent, does not render permanent any gels which also are present. Rather, due to the indicated crosslinker and accelerator, the gels become unstable and diminish in size. If enough time is permitted to lapse with the crosslinker and accelerator being dispersed in the solvent, the gels vanish, or at least essentially or substantially vanish.

Accordingly, gels can be dealt with effectively by providing that, in the coating composition preparation process, with fluoroelastomer and organoaminosilane surface-treated amorphous silica being dispersed throughout the solvent, the bisphenol crosslinking agent and accelerator also are dispersed throughout the solvent, with the crosslinking agent and accelerator being thusly present in the solvent—together with fluoroelastomer and silica as indicated—at least until there are no gels, or substantially or essentially no gels. The bisphenol crosslinking agent and accelerator can be added to the solvent after fluoroelastomer and the organosilane-treated amorphous silica, and after one or more, or all, of the other components are added during the coating composition preparation process. What is necessary for the indicated gel elimination is that, with the solution or dispersion being provided so that the fluoroelastomer and treated amorphous silica are dispersed therein, it is also provided that the crosslinker and accelerator likewise are dispersed therein, along with fluoroelastomer and silica, for a sufficient amount of time to effect the elimination.

The requisite dispersion can be accomplished by any appropriate means. For instance, the materials can be allowed to disperse through the solvent without assistance.

Preferably, dispersion is provided by mixing. A portion or all of the mixing that is employed can be mixing under high shear.

Accordingly, also as a matter of preference, in the process of preparing the coating composition, a composition comprising fluoroelastomer, organoaminosilane surface-treated amorphous silica, and solvent—for instance, comprising the dry compounded fluoroelastomer composition and solvent—is mixed under high shear. Also during the process, bisphenol crosslinking agent and accelerator are included with the materials in solvent, and yet additionally the resulting solution, or dispersion, is maintained, with the bisphenol crosslinking agent and accelerator being dispersed therein, at least until there are no gels, or substantially or essentially no gels.

The bisphenol crosslinking agent and accelerator can be present during the mixing under high shear. If the process continues after mixing under high shear is halted, they can be added after the mixing under high shear is discontinued.

Where the process indeed does continue after mixing under high shear is halted, then further mixing without high shear can be conducted. If the bisphenol crosslinking agent and accelerator are not added until after the mixing under high shear is discontinued, then preferably further mixing without high shear is conducted, to effect the requisite dispersion of crosslinker and accelerator. If there is such further mixing, it can be continued until any remaining gels have disappeared, or substantially or essentially disappeared.

In an embodiment of the coating composition preparation process that is particularly preferred, dry compounded fluoroelastomer composition is combined with solvent, and the resulting mixture or composition is mixed under high shear. After the mixing under high shear is concluded, bisphenol crosslinking agent and accelerator are added, and further mixing, without high shear, is conducted.

Where it is employed, mixing under high shear preferably is continued until it at least reduces the size of gels that are present, and/or at least until it breaks up fluoroelastomer composition agglomerates that are present. High shear can be effected by moving an object or objects, such as milling media—e,g, ceramic or metallic milling media, such as spheres, beads, pellets, or cylindrical milling media—through the fluid; a high speed impeller can be employed to effect high shear. Further, high shear can be provided by ultrasonication. Roll milling, employing the indicated cylindrical milling media, is a particular means for providing the mixing under high shear.

Where it is employed, the amount of time for which mixing without high shear is conducted depends on a variety of factors, such as the extent of crepe hardening in the fluoroelastomer composition that is combined with solvent, the amount of time that mixing under high shear is conducted, the level of shear employed, and the degree of coating smoothness required. This mixing without high shear may be continued for as much as 24 hours, or even longer. In any event, mixing without shear is continued until no gels, or substantially no gels, or essentially no gels, are present. The actual amount of time to be employed in specific instances can be determined without undue experimentation.

Generally as to preparing the coating composition, preferably, in addition to fluoroelastomer and organoaminosilane-treated amorphous silica, the dry compounded composition also comprises cocurative. In accordance with discussion herein, further components for inclusion, but not already present in the dry compounded fluoroelastomer composition—e.g., polydiorganosiloxane oligomer and curable siloxane polymer, as indicated—can be added at any suitable point.

The product of the foregoing process is a coating composition—e.g., a coating solution or a coating dispersion—for preparing a surface layer of the invention. With curative being present therein as indicated, it can be designated a curable composition.

In preparing a surface contacting member of the invention, the coating composition may be applied in a succession of thin coatings, either as discrete layers or as a continuous buildup of layers. Application is by any suitable means, such as dipping, spraying, or transfer coating.

A method of dipping is ring coating. To conduct ring coating, the roller is drawn up through a larger diameter hole machined in two plates, a top plate and a bottom plate. Between the plates is a flexible gasket which forms a liquid tight seal with the roller surface and the top plate. The coating solution is poured into a well created by the roller, the flexible gasket, and the top plate. The roller is drawn up through the gasket and the solution coats the outside of the roller surface. In this manner a minimal amount of solution is used to coat each roller.

After it is applied, each coating is allowed to stand, at room temperature or higher, in order to flash off all or at least most of the solvent. For instance, following each application of a coating layer, evaporation of solvent is effected at temperatures of from about 25° C. to about 90° C. or higher.

When the desired thickness is obtained the resulting layer is cured. Preferably, the layer is heated to a temperature of from about 150° C. to about 250° C. and held for 12 to 48 hours. To prevent bubbling of the layer, either sufficient drying time is allowed for the indicated solvent flash off or evaporation to be completed, or the ramp to cure temperature—i.e., from room temperature to the stated 150° C.–250° C. upper limit—is extended over a period of 2 to 24 hours.

The number of coatings applied to form the surface layer of the invention is that which will provide the appropriate thickness, which can be within a range as is conventional in the art. Specifically, the surface layer can be of a thickness as is suitable for the systems and processes in which it is employed, and the requisite thickness for particular instances can be determined without undue experimentation.

Particularly where the fuser member is a surface contacting member of the invention, the fusing surface layer can be provided in a thickness within any of the ranges which are taught, in the application identified, as being suitable for the fuser member of the toner fusing system and process of that application. Where it thusly is provided in a thickness within any of those ranges, a fusing surface layer of the present invention indeed can be used with the fuser member of that toner fusing system and process.

Further as to surface layer thickness, one factor to consider, with respect to the acceptable minimum thickness, is whether there is a cushion interposed between the surface layer and base of the surface contacting member. The presence of an intermediate compliant layer allows for stretching of the surface layer during use. Accordingly, in addition to normal wear that is occurring, the delamination effect acting on the surface layer is magnified. And the thicker the cushion interposed between surface layer and base, the more this effect is magnified.

As to the foregoing, where the surface layer of the invention resides right on the surface contacting member base, then there is no deformability to magnify the delamination effect. In this instance, the surface layer can be as thin as about 12 microns.

However, where there is a cushion layer or layers interposed between surface layer and base, then if the total thickness of the intermediate compliant layer or layers is less than or equal to about 2500 microns, the surface layer should have a thickness of not less than about 25 microns. And if the total thickness of the intermediate compliant layer or layers is greater than about 2500 microns, then the surface layer should be at least about 38 microns thick.

There are also factors to consider as to preferred maximum surface layer thicknesses in various circumstances. For instance, as a point which is specific to fuser members that are surface contacting members of the invention, if internal heating is employed, then the surface layer must not be so thick as to impede heat transfer impermissibly, and thereby cause the base or core temperature to become excessive. Accordingly, even where the surface layer is directly adjacent to the base, the layer preferably is not thicker than about 400 microns.

With fuser member surface layers of the invention where there is no internal heating, or with surface contacting members—e.g., support and gloss control members—which are not subjected to this heat transfer factor, then the layer can be thicker. In these circumstances the surface layer can be as thick as about 1000 microns, or even thicker; theoretically there is no thickness upper limit, subject to considerations of cost and processing limitations.

However, if the surface layer of the invention is being provided by a solution or dispersion coating method, such as the method discussed herein, then this factor is likely to put a practical upper limit on thickness. Because of the restricted amount of coating deposited by each application, then a point is reached where multiple iterations become operationally difficult. Accordingly, solution or dispersion coating methods as are known generally limit the surface layer to a thickness of about 500 microns or less.

In the operation of the toner fusing system of the present invention, release agent can be applied to the fusing surface layer, whether or not it is a surface layer of the invention, so that this agent contacts toner on the substrate, and can also contact the substrate, during the operation of the fuser member. Particularly where the fuser base is a cylindrical roller or an endless belt, the release agent is applied, while the base is rotating or the belt is running, upstream of the contact area between fuser member and substrate toner.

If employed, release agent preferably is applied so as to form a film on the fusing surface layer. As a matter of particular preference, release agent is applied so as to form a film that completely, or at least essentially, or at least substantially, covers the fusing surface layer. Also as a matter of preference, during operation of the system the release agent is applied continuously, or at least essentially or at least substantially continuously, to the fusing surface layer.

Release agents are intended to prohibit, or at least lessen, offset of toner from the substrate to the fusing surface layer, and if release agent is employed preferably it acts accordingly. In performing this function, the release agent can form, or participate in the formation of, a barrier or film that releases the toner. Thereby the toner is inhibited in its contacting of, or even prevented from contacting, the actual fusing surface layer, or at least the fluoroelastomer thereof.

Release agents for the toner fusing system and process of the invention can be those known in the art that are suitable. Also, those particularly disclosed in the application identified, and in the application identified, and which are suitable, likewise may be employed.

Release agent is applied to the substrate, particularly in the case of paper, preferably at a rate of from about 0.1 to about 20 microliters, more preferably at a rate of about 1.0 to about 8 microliters, per 8½" by 11" copy. The applicator employed for the purpose accordingly is adjusted to apply the release agent at this rate.

If not surface contacting members of the present invention, the fuser base and the support member, gloss control member (if employed), and release agent applicator (likewise if employed), may be those as are known in the art. As to the fuser base, support member, and release agent applicator, these also may be those as particularly disclosed in the application identified, and in the application identified. If there is not only a gloss control member but also a support member therefor, then whether or not the gloss control member is a surface contacting member of the present invention, its support member may be a support member as is known in the art, or a support member as particularly disclosed in the application identified, and in the application identified.

Internal heating and/or external heating may be employed in the toner fusing system and process of the present invention. Heating means as are known in the art, including conventional external and internal heating means, are suitable, as are the particular external and internal heating members as disclosed in the application identified.

Preferably the fuser base is in the form of a cylindrical roller, with the fuser member correspondingly in the form of a roller—specifically, a fuser roller. Also as a matter of preference, the support member comprises a backup roller. If a gloss control member is employed, also it preferably is in the form of a roller.

A toner fusing system of the invention is shown in FIG. 1. Multilayered fuser roller 10 is a surface contacting member of the invention, and comprises, in sequential order, a fuser base 11, in the form of a hollow cylindrical roller, as well as a cushion layer 12 and a fusing surface layer 13. Fusing surface layer 13 has hexamethyldisilazane surface-treated fumed silica filler particles (not depicted in FIG. 1) dispersed therein. Internal heating member 14, an optional element in the invention, is disposed in the hollow portion of fuser base 11.

External heating members 15 and 16 are in the form of hollow cylindrical rollers; their rotational directions, and the rotational directions of all the other rotating elements, are shown by their respective arrows. The rotational directions as depicted can all be reversed.

External heating members 15 and 16 are heated by respective heating lamps 17. These two contact heating members are spaced apart by a distance less than the diameter of fuser member 10, which is in contact with both. Contact heating members 15 and 16 transfer heat to fuser member 10 by their contact with fusing surface layer 13.

Metering roller 30 is partly immersed in sump 29. As metering roller 30 turns, it rubs against pad 32 residing on the bottom of sump 29, and it transports on its surface release agent 34 from the sump to delivery roller 18. With metering blade 31 controlling the application rate, delivery roller 18 transfers release agent 34 to fusing surface layer 13.

Support member 19, in the form of a backup roller, cooperates with fuser member 10 to form fusing nip or contact arc 20. Copy paper or other substrate 21, carrying unfused toner images 22, passes through fusing nip 20 so that toner images 22 are contacted by fusing surface layer 13. Support member 19 and fuser member 10 act together to apply pressure to the paper 21 and toner 22, and fuser member 10 also provides heat, with the heat and pressure serving to fuse toner 22 to the paper 21.

From fusing nip 20, paper 21 continues to gloss control roller 27, which cooperates with support member 33; like support member 19, support member 33 also is in the form of a backup roller. Gloss control roller 27 contacts the image formed by fused toner 22, imparting finish and desired gloss thereto.

Dispensing roller 23 feeds cleaning web 24 over advance roller 25, to be rolled up onto collecting roller 23. In passing along roller 25, web 24 contacts and cleans contact heating members 15 and 16.

Each of pad 32 and cleaning web 24 is a polyamide material. A polyamide web which may be employed for these purposes is commercially available under the trademark Nomex® from BMP of America, Medina, N.Y. Any other suitable material may be employed instead.

In place of the indicated cleaning assembly, any other means or apparatus appropriate for cleaning the contact heating members may be employed. Alternatively, the contact heating members can be provided with a nonstick coating. This coating can be a fluoroplastic, as discussed herein, and it can include a heat conducting filler, also as discussed herein. Where the contact heating members have a nonstick coating the means for cleaning these members can be omitted.

Figure 2:
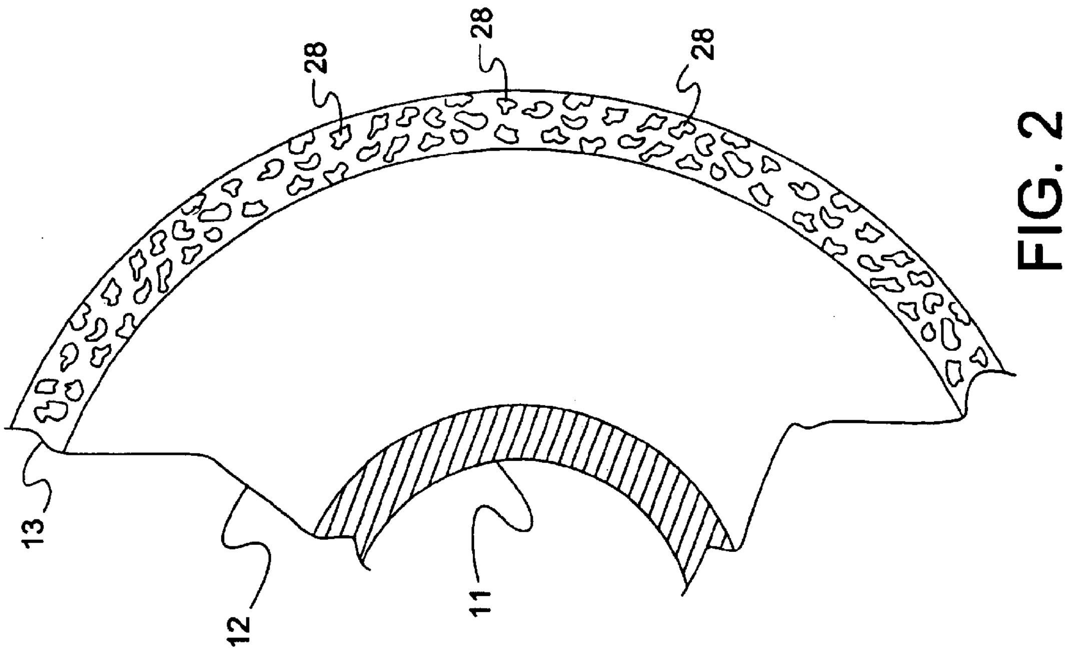
FIG. 2 is a schematic representation, and an enlarged fragmentary sectional view, of an embodiment of the fuser member of the invention.

FIG. 2 shows a fragmentary view of an embodiment of fuser member 10, magnified to show the multiple layers in greater detail. Hexamethyldisilazane surface-treated fumed silica filler particles 28 are distributed through fusing surface layer 13.

Figure 3:
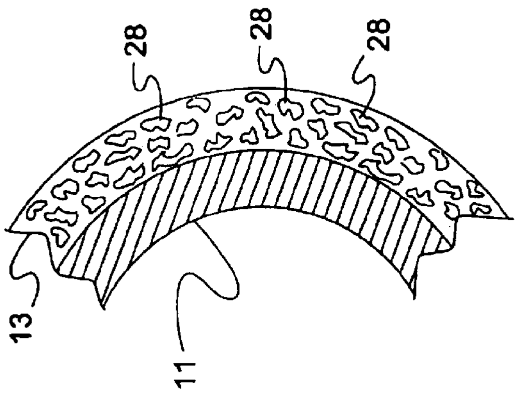
FIG. 3 is a schematic representation, and an enlarged fragmentary sectional view, of another embodiment of the fuser member of the invention.

FIG. 3 shows a fragmentary view of another embodiment of fuser member 10, also magnified to show greater detail. In this embodiment there is no cushion, and fusing surface layer 13 resides directly on fuser base 11.

FIGS. 2 and 3 each can also represent another surface contacting member of the invention, such as a support member or a gloss control member. Particularly where the release agent applicator is a donor roller oiler serving as a surface contacting member of the invention, then each of FIGS. 2 and 3 can represent the delivery roller of the applicator.

The invention is illustrated by the following procedures; these are provided for the purpose of representation, and are not to be construed as limiting the scope of the invention. Unless stated otherwise, all percentages, parts, etc. are by weight.

EXPERIMENTAL PROCEDURES

Materials Employed in the Procedures

Viton® A fluoroelastomer, a copolymer of vinylidene fluoride and hexafluoropropylene $Fe_2O_3$, 0.7 microns mean particle diameter, from Harcros Pigments Inc., Easton, Pa.

Fumed $SiO_2$, having a surface area of approximately 130+/−15 $m^2$ per gram (Cab-O-Sil® LM-130), hexamethyldisilazane surface-treated fumed $SiO_2$, having a surface area of approximately 212+/−28 $m^2$ per gram (Cab-O-Sil® TS-530), and polydimethylsiloxane surface-treated fumed $SiO_2$, having a surface area of approximately 100+/−20 $m^2$ per gram (Cab-O-Sil® TS-730), all from Cabot Corporation MgO (Maglite™-Y), from Merck/Calgon Corp., Teterboro, N.J.

PS513 bis(aminopropyldimethylsiloxy)terminated polydimethylsiloxane wetting agent, from United Chemical Technologies, Inc., Bristol, Pa.

60,000 centistoke DC200 polydimethylsiloxane, from Dow Corning Corporation

Viton® Curative No. 50

Catalyst 50, from Emerson & Cuming ICI

Silastic™-J 60 Shore A addition cure RTV silicone rubber

EC4952 65 Shore A condensation cure RTV silicone rubber

Preparation of Fluoroelastomer Compositions

Composition 1

300 grams of fluoroelastomer, 36 grams of MgO, and 136.2 grams of hexamethyldisilazane surface-treated fumed silica were thoroughly compounded for 40 minutes, on a water cooled two roll mill at approximately 17° C., until a uniform, dry composite sheet was obtained. The indicated silica compound was approximately 30 percent by volume of this resulting composition.

Composition 2

7.2 grams of fluoroelastomer were dissolved in 30 grams of MEK, and 36 grams of hexamethyldisilazane surface-treated fumed silica were mixed with this solution to reduce dusting. The resulting mixture was allowed to dry. Then 292.8 grams of fluoroelastomer, 36 grams of MgO, and the indicated silica/fluoroelastomer mixture were thoroughly compounded for 40 minutes on a water cooled two-roll mill at approximately 17° C. until a uniform, dry composite sheet was obtained. The indicated silica compound was approximately 10 percent by volume of this resulting composition.

Compositions 3 and 4

Compositions 3 and 4 were prepared in substantially the same manner as Composition 1, except that for Composition 3, 136.2 grams of polydimethylsiloxane surface-treated fumed silica, and for Composition 4, 136.2 grams of the untreated fumed silica (Cab-O-Sil® LM-130), were used in place of the Composition 1 hexamethyldisilazane-treated silica. The indicated silica fillers were each approximately 30 percent by volume of their respective compositions.

Composition 5

300 grams of fluoroelastomer, 36 grams of MgO, and 498 grams of $Fe_2O_3$ were thoroughly compounded for 40 minutes on a water cooled two roll mill at 63° F. (approx. 17° C.) until a uniform, dry composite sheet was obtained. This resulting composition was approximately 35 percent by volume $Fe_2O_3$.

Composition 6

300 grams of fluoroelastomer, 36 grams of MgO, 213 grams of $Fe_2O_3$, and 97.8 grams of hexamethyldisilazane surface-treated fumed silica were thoroughly compounded for 40 minutes on a water cooled two roll mill at 63° F. (approx. 17° C.) until a uniform, dry composite sheet was obtained. This resulting composition was approximately 15 percent by volume $Fe_2O_3$, and approximately 20 percent by volume treated silica.

Composition 7

300 grams of fluoroelastomer, 36 grams of MgO, 357 grams of $Fe_2O_3$, and 49.5 grams of hexamethyldisilazane surface-treated fumed silica were thoroughly compounded for 40 minutes on a water cooled two roll mill at 6320 F. (approx. 17° C.) until a uniform, dry composite sheet was obtained. This resulting composition was approximately 25 percent by volume $Fe_2O_3$, and approximately 10 percent by volume treated silica.

Preparation of Fuser Members

The foregoing fluoroelastomer compositions were used to prepare the fuser rollers of Examples 1–8 and Comparative Examples 1–10, in the manner as set forth below.

EXAMPLE 1

A cylindrical stainless steel fuser core was cleaned with dichloromethane and dried. The core was then primed with a uniform coat of Dow™ 1200 RTV Prime Coat primer. Silastic™-J silicone rubber was then mixed with catalyst, injection molded onto the core, and cured at 232° C. for 2 hours under 75 tons/$inch^2$ of pressure.

The roller was then removed from the mold and baked in a convection oven with a temperature ramp increasing to 232° C. substantially uniformly over 24 hours, and this temperature then being maintained for an additional 24 hours. After air cooling, EC4952 silicone rubber was blade coated directly onto the Silastic™-J silicone rubber layer, then cured for 12 hours at about 210° C., followed by 48 hours at 218° C. in a convection oven. After air cooling, the EC4952 silicone layer was ground to a thickness of 0.457 mm (0.018 inches), and the thusly layered fuser core was corona discharge treated for 1 minute at 300 watts.

The resulting product was a fuser core with a 10.16 mm (0.4 inch) base cushion topped by a ground surface. This cushion was made up of a Silastic™-J silicone layer having a thickness of 9.7 mm (0.382 inches), overlaid by an EC4952 silicone layer having the thickness as indicated.

At about 5 ½ weeks after its preparation, 76 grams of the Composition 1 composite sheet were divided into small pieces. The cut up Composition 1 portion was combined with 274 grams of MEK. This mixture was placed in a ceramic crock with cylindrical milling media, and roll milled for 24 hours to produce a dispersion.

15 grams of this dispersion, 0.06 grams of Viton® Curative No. 50, and 0.0645 grams of PS513 were combined, and mixed in a glass jar for 24 hours to produce a curable solution. This solution was filtered with a medium paint filter, and degassed for 1 minute under 25 mm Hg vacuum.

After filtration and degassing, the curable solution was ring coated twice onto the cushion of the corona discharge treated roller, which had first been wiped with isopropyl alcohol to prepare for the coating. The thusly coated roller was cured by ramping the temperature to 230° C. over a 12 hour period, and then holding the temperature at 230° C. for 24 hours. The resulting fuser roller surface was uniform and glossy.

COMPARATIVE EXAMPLE 1

A fuser roller was prepared in substantially the same manner as that of Example 1, except that the curative was added to the solution 1 hour instead of 24 hours before coating. The resulting fuser roller surface contained gel defects.

EXAMPLE 2

A fuser roller was prepared in substantially the same manner as that of Example 1, except that the PS513 was added to the solution 2 hours instead of 24 hours before coating. The resulting fuser roller surface contained no gel defects.

COMPARATIVE EXAMPLE 2

A fuser roller was prepared in substantially the same manner as that of Example 1, except that the curative and the PS513 were added to the solution 0.5 hours instead of 24 hours before coating. The resulting fuser roller surface contained gel defects.

The foregoing Examples and Comparatives Examples, all considered together, demonstrate that insufficient curative residence time, in the mixing solution, unfavorably affects the resulting product, while reducing the residence time of PS513, when it is used, does not.

COMPARATIVE EXAMPLE 3

About 5 weeks after Composition 1 was prepared, and employing 1.58 parts curative per 100 parts by weight fluoroelastomer and 0.5 parts PS513 per 100 parts by weight dispersion, a fuser roller was otherwise prepared in substantially the same manner as that of Example 1, except that the roll milling (with milling media) was conducted for 96 hours (in contrast with the 24 hours of Example 1), and the subsequent mixing (no milling media) was conducted for 30 minutes (in contrast with the 24 hours of Example 1). The resulting fuser roller surface contained gel defects.

COMPARATIVE EXAMPLE 4

The fluoroelastomer composition of Comparative Example 3 was rebanded on a two-roll mill, and recompounded for 30 minutes at 16–18° C. A solution was prepared by combining 14 grams of the freshly milled composition with 61 grams of MEK, in a ceramic crock with cylindrical milling media, and roll milling the mixture for 24 hours to produce a dispersion with a viscosity of 202 cp.

This dispersion was combined with 0.28 parts Viton® Curative No. 50 per 100 parts by weight fluoroelastomer, and 0.316 parts PS513 per 100 parts by weight dispersion, and mixed in a glass jar (no milling media) for 30 minutes to produce a curable solution. The curable solution was filtered with a medium paint filter, and degassed for 1 minute under 25 mm Hg.

After filtration and degassing, the curable solution was employed to prepare a fuser roller in substantially the same manner as set forth in Example 1. The resulting fuser roller surface contained gel defects.

EXAMPLE 3

The curable solution of Comparative Example 3 was mixed in a glass jar (no milling media) for 24 hours, then employed to prepare a fuser roller in substantially the same manner as set forth in Example 1. The resulting fuser roller surface was glossy and free of gel defects.

EXAMPLE 4

The curable solution of Comparative Example 4 was mixed in a glass jar (no milling media) for 24 hours, then employed to prepare a fuser roller in substantially the same manner as set forth in Example 1. The resulting fuser roller surface was glossy and free of gel defects.

The foregoing Examples and Comparatives Examples show that failing to allow sufficient curative residence time, in the mixing solution, allows the unfavorable effects of crepe hardening to persist, while reducing PS513 residence time (Example 2 and Comparative Example 2) has no influence in this regard. It is also shown that lengthening the time period for mixing under shear (Comparative Example 3), or submitting the fluoroelastomer composition to additional compounding (Comparative Example 4), do not eliminate these unfavorable effects.

EXAMPLE 5

A fuser core with a base cushion was prepared in substantially the same manner as that of Example 1, except that the thickness of the Silastic™-J silicone layer was 4.572 mm (0.18 inches), and in place of the blade coated EC4952 silicone layer, the Silastic™-J silicone layer was topped with a silicon rubber solution. Specifically, a solution comprising 27 weight percent MEK and 73 weight percent EC4952 was prepared, and then Catalyst 50 was added, in an amount of 1 part to 400 parts by weight EC4952. The Silastic™-J silicone layer was wiped with isopropyl alcohol, and ring coated with the silicon rubber solution. This solution was allowed to air cure, producing a smooth surface. The resulting core and cushion construct was corona discharge treated for 1 minute at 300 watts.

Immediately after milling, 40 grams of the Composition 2 composite sheet were divided into small pieces. The cut up Composition 2 portion was combined with 135 grams of MEK. This mixture was placed in a glass jar and mixed, with no milling media, for 72 hours, to produce a dispersion.

This dispersion was combined with 1 gram of Viton® Curative No. 50 and 0.87 grams of PS513, and the result was mixed in a glass jar (with no milling media) for 30 minutes to produce a curable solution. This solution was filtered with a medium paint filter, and degassed for 1 minute under 25 mm Hg vacuum.

After filtration and degassing, the curable solution was ring coated twice onto the cushion of the corona discharge treated roller. The thusly coated roller was cured by ramping the temperature to 230° C. over a 12 hour period, and then holding the temperature at 230° C. for 24 hours. The resulting fuser roller surface was uniform and glossy.

COMPARATIVE EXAMPLE 5

A fuser roller was prepared in substantially the same manner as that of Example 5, except with the following differences. The portion of Composition 2 employed here was used 14 weeks after its preparation. 10 grams of this composition were employed with 30 grams of MEK to prepare the dispersion, and 0.18 grams of PS513 and 0.16 grams of the curative were used to prepare the curable solution, which had a viscosity of 187 cp. The resulting fuser roller surface contained gel defects.

Example 5 and Comparative Example 5 show the significance of silica content and standing time with respect to crepe hardening. Both employed Composition 2, with a relatively low proportion of silica (10 volume percent), as compared with the 30 volume percent silica Composition 1 of the previous Examples.

In Example 5, this lesser silica content, together with the Composition 2 portion being used immediately after milling—i.e., not being allowed to stand—precluded the development of gels requiring elimination. Accordingly, coating composition preparation steps that address gel hardening were not a factor. However, from Comparative Example 5 it is evident that even at a low level of the treated silica, if sufficient time passes before combination with solvent, then crepe hardening eventually progresses to the point where it comes into play. At this point, not employing the requisite process parameters in preparing the coating composition does result in gel defects.

COMPARATIVE EXAMPLE 6

Nine days after its preparation, 20 grams of the Composition 3 composite sheet were divided into small pieces. The cut up Composition 3 portion was combined with 60 grams of MEK. This mixture was placed in a ceramic crock with cylindrical milling media, and roll milled for 72 hours to produce a dispersion.

This dispersion was combined with 0.32 grams of Viton® Curative No. 50 and 0.4 grams of PS513, and mixed in a glass jar (with no media) for 5 hours to produce a curable solution. The curable solution was filtered with a medium paint filter, and degassed for 1 minute under 25 mm Hg.

After filtration and degassing, the curable solution was employed to prepare a fuser roller in substantially the same manner as set forth in Example 1. The resulting fuser roller surface was uniform, but fairly rough and not glossy.

COMPARATIVE EXAMPLE 7

A fuser roller was prepared in substantially the same manner as that of Comparative Example 6, except that the roll milling (milling media) was conducted for only 24 hours (in contrast with the 72 hours of Comparative Example 6), and the subsequent mixing (no milling media) was conducted for 24 hours (in contrast with the 5 hours of Comparative Example 6). The resulting fuser roller surface was uniform, but fairly rough and not glossy.

COMPARATIVE EXAMPLE 8

Employing Composition 4 eight days after its preparation, a fuser roller otherwise was prepared in substantially the same manner as that of Comparative Example 6. The resulting fuser roller surface was cracked and non-uniform.

For the fuser rollers of the preceding Examples 1–5 and Comparative Examples 1–8, surface roughness was measured with a Surfanalyzer® System 4000, from Mahr Federal Inc., Providence, R.I., using a parallel chisel probe (EPT-1043) and a conical probe (2.5 micron radius), at a speed of 2.54 mm/minute and a cutoff of 0.8 mm. The results are reported in Table 1, along with the presence or absence of gel defects in the fuser roller surfaces.

TABLE 1

| | Roughness | | | | Gel |
|---|---|---|---|---|---|
| | Conical probe | | Chisel Probe | | |
| | 250 mg | 50 mg | 250 mg | 50 mg | Defects |
| Ex1 | — | 48 | — | 55 | N |
| CE1 | — | 94 | — | 114 | Y |
| Ex2 | | 55.6 | | 57.6 | N |
| CE2 | | 96 | | 115 | Y |
| CE3 | | | | | Y |
| CE4 | | 119 | | 153 | Y |
| Ex3 | | 57 | | 71 | N |
| Ex4 | — | 43 | — | 50 | N |
| Ex5 | 17.3 | 19.7 | 22 | 27 | N |
| CE5 | 21 | 42 | 23 | 21 | Y |
| CE6 | 55 | 60 | 58 | 65 | * |
| CE7 | 78 | 89 | 89 | 86 | * |
| CE8 | 113 | 122 | 124 | 86 | * |

* Coating and solution too opaque and rough to detect
CE = Comparative Example

COMPARATIVE EXAMPLE 9

Employing Composition 5, a fuser roller was otherwise prepared in substantially the same manner as that of Example 1, except for the following differences. The roll milling (milling media) was conducted with a 74 gram solution, comprising 37.5 percent by weight of the fluoroelastomer composition in MEK. The resulting dispersion was employed with 0.638 grams of Viton® Curative No. 50 and 0.333 grams of PS513, and the mixing (no milling media) was conducted for 30 minutes (in contrast with the 24 hours in Example 1).

EXAMPLE 6

Employing Composition 6 two days after its preparation, a fuser roller was otherwise prepared in substantially the same manner as that of Example 1, except for the following differences. A jar with several ceramic beads was used for the roll milling, which was conducted using a solution of 40 grams of the fluoroelastomer composition, combined with 64.5

Of MEK. The resulting solution was free of gel defects; it was employed with 0.92 grams of Viton® Curative No. 50 and 0.47 grams of PS513, and the mixing (no milling media) was conducted for 30 minutes (in contrast with the 24 hours in Example 1).

EXAMPLE b 7

Employing Composition 7, a fuser roller was otherwise prepared in substantially the same manner as that of Example 1, except for the following differences. For the fuser core, the thickness of the Silastic™-J silicone layer was 4.572 mm (0.18 inches). The roll milling was conducted using a solution of 90 grams of the fluoroelastomer composition, combined with 150 grams of MEK. 230 grams of the resulting solution were employed with 2.4 grams of Viton® Curative No. 50 and 1.0386 grams of PS513, and the mixing (no milling media) was conducted for 30 minutes (in contrast with the 24 hours in Example 1). The curable solution was ring coated three times onto the roller cushion.

For the fuser rollers of the preceding Comparative Example 9 and Examples 6 and 7, fuser roller surface wear was measured using a modified Norman Abrasion Wear Tester, Norman Tool, Inc., Evansville, Ind. To perform this testing, a sample including cushion and surface layer was cut from the fuser roller, and trimmed to a width of 0.59 inches and a thickness of about 0.04 inches. The sample was placed on a heated stage, and worn with 11⁄16" Norman wear test paper using a 755 gram load.

The sample was first worn until failure occurs. This treatment was repeated three times, and is reported as the number of cycles before failure. A fixed number of cycles was selected, and the wear rate was determined by measuring the worn groove depth (without penetration of the coated layer) for a given number of wear cycles. The wear rate was calculated in microns per 100 cycles.

The results of the wear testing are shown in Table 2.

TABLE 2

| | Vol % Fe203 | Vol % Silica | Number of Cycles before failure | | | Wear rate in microns/100 cycles |
|---|---|---|---|---|---|---|
| CE9 | 35 | 0 | 100 | 160 | 140 | 47.24 |
| Ex6 | 15.5 | 17 | 970 | 1073 | 970 | 3.55 |
| Ex7 | 25.5 | 8.5 | 625 | 666 | 610 | 10.67 |

The foregoing data demonstrate the dramatic improvement in wear resistance obtained with a surface layer of the invention, where a portion of the $Fe_2O_3$ filler has been replaced by a like amount of organoaminosilane surface-treated amorphous silica.

EXAMPLE 8

A fuser core with a base cushion was prepared in substantially the same manner as that of Example 1, except that the thickness of the Silastic™-J silicone layer was 4.572 mm (0.18 inches). Employing Composition 1 two days after its preparation, 50 grams of the fluoroelastomer composition and 200 grams of MEK were combined, and mixed, with no milling media, in a glass jar for 48 hours, to provide dissolution. The solution thereby obtained was combined with 1 gram of Viton® Curative No. 50 and 1 gram of PS513, and the result was mixed in a glass jar (with no milling media) for 30 minutes to produce a curable solution. The curable solution was filtered with a medium paint filler, and degassed for one minute under 25 mm Hg.

After filtration and degassing, the curable solution was employed to prepare a fuser roller in substantially the same manner as set forth in Example 1, except that only one coating was applied.

COMPARATIVE EXAMPLE 10

A fuser core with a base cushion was prepared in substantially the same manner as that of Example 1, except that the thickness of the Silastic™-J silicone layer was 4.572 mm (0.18 inches). 85 grams of Composition 5 and 120 grams of MEK were combined, and mixed, with no milling media, in a glass jar for 48 hours, to provide dissolution. The solution thereby obtained was combined with 0.8 grams of Viton® Curative No. 50 and 1 gram of PS513, and the result was mixed in a glass jar (with no milling media) for 30 minutes to produce a curable solution. The curable solution was filtered with a medium paint filler, and degassed for one minute under 25 mm Hg.

After filtration and degassing, the curable solution was employed to prepare a fuser roller in substantially the same manner as set forth in Example 1, except that only one coating was applied.

A Heidelberg Digimaster™ 9110 electrophotographic process was used to apply unfused toner to paper substrates, with this toner being fixed to the paper by the HD9110 fuser. To compare the fuser rollers of Example 8 and Comparative Example 10, they were employed with this fuser, which was used to compare the respective performances of these rollers. For this purpose, the release oil of the HD9110 fuser was changed from the standard 60,000 cSt release fluid to a blend of 87.5 weight percent DC200 and 12.5 weight percent of an α-amino-propyldimethylsiloxy, ω-trimethylsiloxy terminated polydimethyl-siloxane with a number average molecular weight of 12,000. The rate of application was 2.5 milligrams per copy.

The Example 8 fuser roller was run in a life test to 300,000 copies. This roller did not wear through at the edges or show signs of delamination.

The fuser roller of Comparative Example 10 was run in a life test to 300,000 copies. The roller showed delamination of the surface layer at the paper edge, and in the paper path of the roller.

Measurement of surface wear at the paper edge found the fuser roller of Example 8 to wear at a rate of 0.08–0.09 mils/100K wear, while the fuser roller of Comparative Example 10 wore at a rate of 0.26–0.28 mils/100k wear.

Finally, although the invention has been described with reference to particular means, materials, and embodiments, it should be noted that the invention is not limited to the particulars disclosed, and extends to all equivalents within the scope of the claims.

What is claimed is:

1. A composition comprising:

(a) at least one fluoroelastomer; and (b) amorphous silica in aggregate form, surface treated with at least one organoaminosilane.

2. The composition of claim 1 further comprising at least one curative.

3. The composition of claim 2 wherein the organoaminosilane comprises at least one member selected from the group consisting of (a) silazanes selected from the group consisting of hexamethyldisilazane, 1,3-diphenyltetramethyldisilazane, 1,3-divinyl tetramethyldisilazane, heptamethyldisilazane, and 2,2,4,4,6,6-hexamethylcyclotrisilazane;

(b) amine functional organosilanols having the formula $$R_1SiR_2R_3R_4$$

wherein $R_1$ is selected from the group consisting of primary, secondary and tertiary amino group-containing $C_1$–$C_{10}$ hydrocarbyl groups;

from one to all three of $R_2$, $R_3$, and $R_4$ have the formula —$OR_5$, with the remainder being the same or different, and being selected from the group consisting of $C_1$–$C_8$ hydrocarbyl groups and hydrogen; and each $R_5$ is the same or different $C_1$–$C_8$ hydrocarbyl group; and (c) amine functional organohalosilanes having the formula $$R_6SiR_7R_8R_9$$

wherein $R_6$ is selected from the group consisting of tertiary amino group-containing $C_1$–$C_{10}$ hydrocarbyl groups; and from one to all three of $R_7$, $R_8$, and $R_9$ are the same or different halogen, with the remainder also being the same or different, and being selected from the group consisting of $C_1$–$C_8$ hydrocarbyl groups and hydrogen.

4. The composition of claim 3 further comprising at least one solvent.

5. The composition of claim 3 wherein the organoaminosilane comprises hexamethyldisilazane.

6. The composition of claim 3 wherein the curative comprises a bisphenol curing system, the bisphenol curing system comprising at least one bisphenol crosslinking agent and at least one accelerator.

7. The composition of claim 6 further comprising at least one cocurative.

8. The composition of claim 7 wherein the at least one cocurative comprises at least one member selected from the group consisting of MgO and ZnO.

9. A composition comprising:

(a) at least one fluoroelastomer; and (b) amorphous silica in aggregate form surface treated with at least one silazane selected from the group consisting of hexamethyldisilazane, 1,3-diphenyltetramethyldisilazane, 1,3-divinyl tetramethyldisilazane, heptamethyldisilazane, and 2,2,4,4,6,6-hexamethylcyclotrisilazane.

10. The composition of claim 9 further comprising at least one curative.

11. The composition of claim 9 further comprising at least one solvent.

12. The composition of claim 9 wherein the at least one silazane comprises hexamethyldisilazane.

13. A process for preparing a surface contacting member coating composition, comprising providing a solution or dispersion comprising solvent, at least one fluoroelastomer, and amorphous silica surface treated with at least one organoaminosilane, wherein the at least one fluoroelastomer and the amorphous silica surface treated with at least one organoaminosilane are dispersed throughout the solvent, and also providing that a bisphenol curing system comprising at least one bisphenol crosslinking agent and at least one accelerator also is dispersed throughout the solvent, with the at least one bisphenol crosslinking agent and the at least one accelerator being dispersed throughout the solvent, together with the at least one fluoroelastomer and the amorphous silica surface treated with at least one organoaminosilane, at least until gels are essentially absent from the solution or dispersion.

14. The process of claim 13 comprising mixing under high shear the solution or dispersion comprising solvent, at least one fluoroelastomer, and amorphous silica surface treated with at least one organoaminosilane, and maintaining the solution or dispersion, having dispersed therein the bisphenol curing system comprising at least one bisphenol crosslinking agent and at least one accelerator, at least until gels are essentially absent from the solution or dispersion.

15. The process of claim 14 comprising:

(a) mixing under high shear a solution or dispersion comprising:

(i) at least one fluoroelastomer;

(ii) amorphous silica surface treated with at least one organoaminosilane; and (iii) solvent (b) adding to the solution or dispersion a bisphenol curing system comprising at least one bisphenol crosslinking agent and at least one accelerator; and (c) mixing, without high shear, the solution or dispersion with the bisphenol curing system therein, at least until gels are at least essentially absent from the solution or dispersion.

16. The process of claim 15 wherein the organoaminosilane comprises at least one member selected from the group consisting of (a) silazanes selected from the group consisting of hexamethyldisilazane, 1,3-diphenyltetramethyldisilazane, 1,3-divinyl tetramethyldisilazane, heptamethyldisilazane, and 2,2,4,4,6,6-hexamethylcyclotrisilazane;

(b) amine functional organosilanols having the formula $$R_1SiR_2R_3R_4$$

wherein $R_1$ is selected from the group consisting of primary, secondary and tertiary amino group-containing $C_1$–$C_{10}$ hydrocarbyl groups;

from one to all three of $R_2$, $R_3$, and $R_4$ have the formula —$OR_5$, with the remainder being the same or different, and being selected from the group consisting of $C_1$–$C_8$ hydrocarbyl groups and hydrogen; and each $R_5$ is the same or different $C_1$–$C_8$ hydrocarbyl group; and (c) amine functional organohalosilanes having the formula $$R_6SiR_7R_8R_9$$

wherein $R_6$ is selected from the group consisting of tertiary amino group-containing $C_1$–$C_{10}$ hydrocarbyl groups; and from one to all three of $R_7$, $R_8$, and $R_9$ are the same or different halogen, with the remainder also being the same or different, and being selected from the group consisting of $C_1$–$C_8$ hydrocarbyl groups and hydrogen.

17. The process of claim 16 wherein the solution or dispersion further comprises at least one cocurative.

18. The process of claim 17 wherein the solution or dispersion further comprises at least one α,ω difunctional polydiorganosiloxane.

* * * * *